United States Patent
Kikuchi et al.

(10) Patent No.: US 7,075,396 B2
(45) Date of Patent: Jul. 11, 2006

(54) SUPERCONDUCTING COIL SYSTEM

(75) Inventors: Mitsuru Kikuchi, Ibaraki (JP); Toshinari Ando, Ibaraki (JP)

(73) Assignee: Japan Atomic Energy Research Institute, Chiba-Ken (JP)

( * ) Notice: Subject to any disclaimer, the term of this patent is extended or adjusted under 35 U.S.C. 154(b) by 236 days.

(21) Appl. No.: 10/629,837

(22) Filed: Jul. 30, 2003

(65) Prior Publication Data

US 2004/0040737 A1 Mar. 4, 2004

(30) Foreign Application Priority Data

Aug. 30, 2002 (JP) ............................. 2002-253860

(51) Int. Cl.
*H01F 1/00* (2006.01)
(52) U.S. Cl. .................... 335/216; 335/296; 174/125.1
(58) Field of Classification Search ............. 174/125.1; 335/216, 296–299; 324/318–322
See application file for complete search history.

(56) References Cited

U.S. PATENT DOCUMENTS 4,336,420 A * 6/1982 Benz ....................... 174/125.1
6,043,731 A * 3/2000 McDougall et al. ...... 338/32 S
6,510,604 B1 * 1/2003 Pourrahimi ................... 29/599

OTHER PUBLICATIONS

M. Huguet, "Key Engineering Features of the ITER-FEAT Magnet System and Implications for the R&D Programme" 18th IAEA Fusion Energy Conference: IAEA-CN-77/OV6/1. pp. 1-12.

* cited by examiner

*Primary Examiner*—Lincoln Donovan
(74) *Attorney, Agent, or Firm*—Banner & Witcoff, Ltd.

(57) ABSTRACT

A superconducting coil system comprising a superconducting coil and a normal conducting coil, the normal conducting coil having a current time constant ($L_2/R_2$) which is larger than $L_1/R_1$, or the time constant at which the current through the superconducting coil decays rapidly after the conductors in the superconducting coil made a transition to the normal conducting state, in which $L_1$ and $L_2$ represent the self-inductances of the superconducting coil and the normal conducting coil, respectively, $R_1$ represents the resistance for causing rapid decay of the current flow through the superconducting coil, and $R_2$ represents the resistance of the normal conducting coil.

8 Claims, 3 Drawing Sheets

Fig. 4
(a) (PRIOR ART)
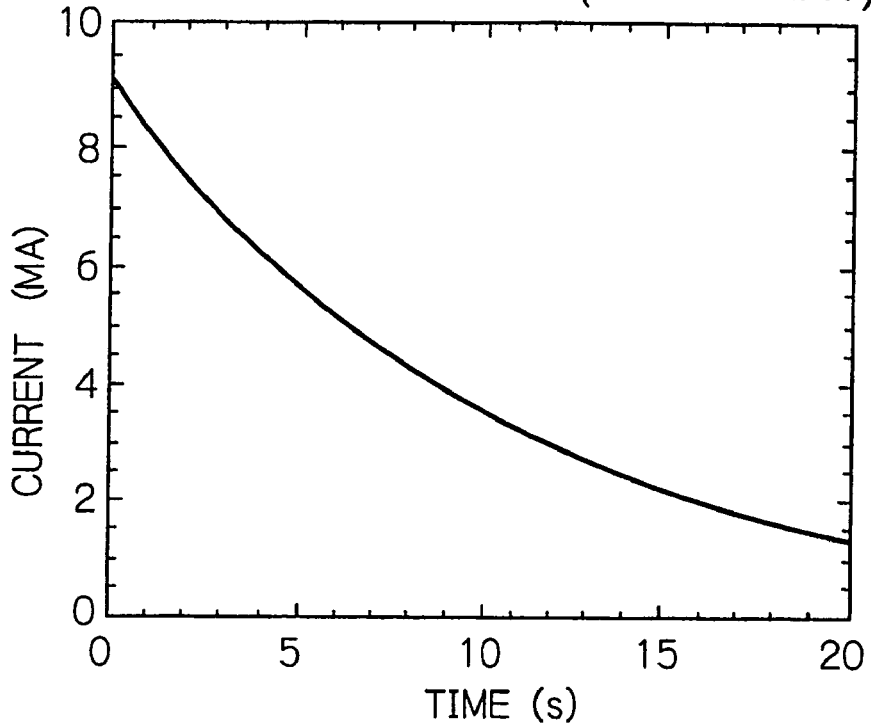
(b)
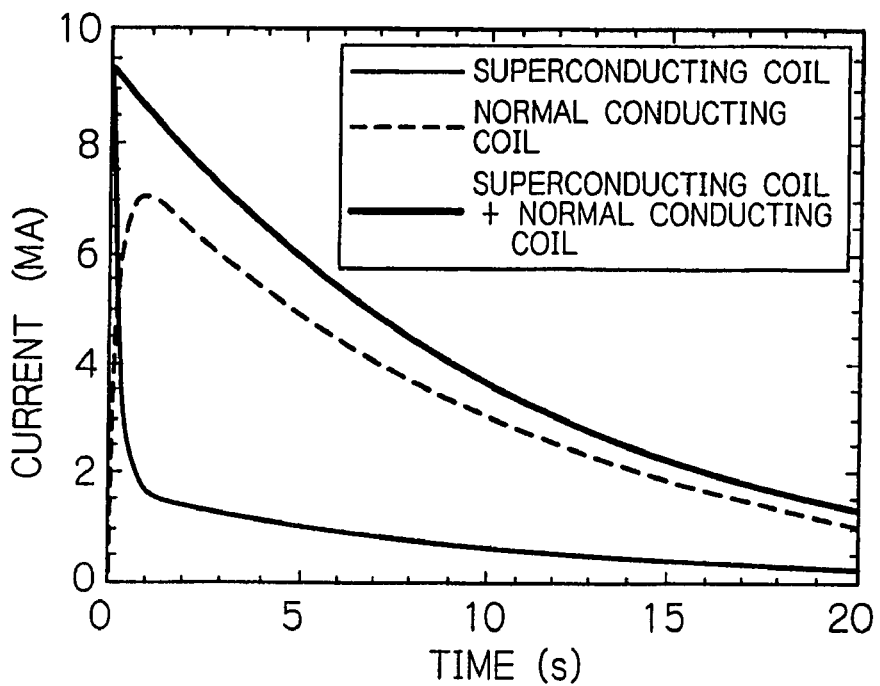

SUPERCONDUCTING COIL SYSTEM

This application is based upon and claims the benefit of priority from Japanese Patent Application No. 2002-253860 filed Aug. 30, 2002, the entire contents of this application are incorporated herein by reference.

BACKGROUND OF THE INVENTION

This invention relates to the superconducting coil technology as well as the nuclear fusion reactor technology.

Superconductors making up superconducting coils for generating large amounts of magnetic field as in nuclear fusion reactors are of the cable-in-conduit (CIC) type. A CIC conductor comprises a large number of superconducting wires about 1 mm in diameter that are housed in a metal conduit. When a certain area of the conductor makes a transition to the normally conducting state, the area's temperature will arise due to Joule's heat and can damage the conductor. In order to prevent this problem, pure copper wires are also provided within the metal conduit. FIG. 1A is a cross section of a conventional CIC conductor in the form of a cable comprising about 200 superconducting wires 1 and 21 pure copper wires 2 of three kinds that are housed in a metal conduit 3. FIG. 1B is a cross section of a superconducting coil comprising a winding 6 housed in a coil case 8 as it consists of the CIC conductors 4 that are embedded in stainless steel plates with spiral grooves made in their surfaces.

The quantity of the pure copper wires depends on the decay time of the current flowing through the superconducting coil after the transition to the normal conducting state and the shorter the decay time, the smaller the quantity of heat generated and so is the amount of copper. The magnetic energy accumulated in the superconducting coil is consumed by a resistor provided outside of the coil.

One way to make the CIC conductor compact would be shortening the decay time so as to reduce the amount of pure copper wires and hence the size of the conductor. However, the toroidal field coil made of the superconducting coil for use in nuclear fusion reactors has an internal vacuum chamber for confining the hydrogen fuel. If the decay time of the superconducting coil is shortened, a large varying magnetic field is applied to the vacuum chamber and causes an induction current to flow into the vacuum chamber. The induction current combines with the magnetic field to create a large enough force to damage the vacuum chamber.

SUMMARY OF THE INVENTION

An object, therefore, of the present invention is to provide a method by which the amount of pure copper wires in CIC conductors employed in a superconducting coil system for use in nuclear fusion reactors can be sufficiently reduced or entirely eliminated to reduce the conductor size without destroying the plasma confining vacuum chamber.

BRIEF DESCRIPTION OF THE DRAWINGS

FIG. 4A shows how the current through a superconducting coil which was fabricated of conductors containing pure copper wires diminished when it was caused to decay rapidly to zero; and FIG. 4B shows how the current through a superconducting coil which was fabricated of conductors containing no pure copper wires and the current through a normal conducting coil coupled electrically to the superconducting coil diminished when the current through the superconducting coil was caused to decay rapidly to zero.

DETAILED DESCRIPTION OF THE INVENTION

Figure 2:
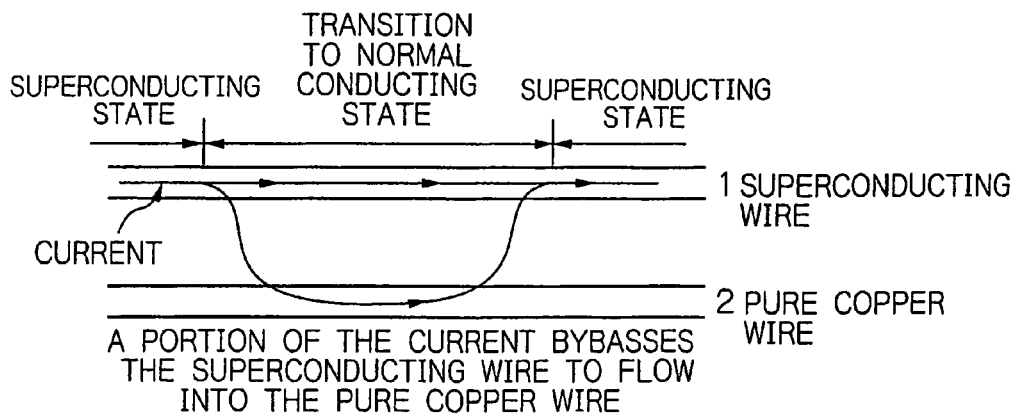
FIG. 2 shows in conceptual form the effectiveness of the pure copper wire.

The CIC superconductor has pure copper wires that carry a bypass current if the live superconductor makes a transition to the normal conducting state, so that the temperature of the superconductor will not become higher than a certain level (typically 250 K) due to Joule's heat. The effectiveness of such pure copper wires is shown diagrammatically in FIG. 2. If a superconducting wire 1 makes a transition to the normal conducting state over a certain length, a portion of the current flow through the superconducting wire 1 diverges into an adjacent pure copper wire 2. As a result, the temperature of the superconducting wire 1 can be held below the critical 250 K in spite of Joule's heat generation during the rapid decaying of the current.

This means the pure copper wires can be eliminated from the superconductor by employing a substitute bypass of current flow. As a result of the intensive studies they made in order to attain this goal, the present inventors found that a copper coil establishing adequate electrical coupling to the superconducting coil serves as a reliable bypass of current flow. The present invention has been accomplished on the basis of this finding.

Figure 3:
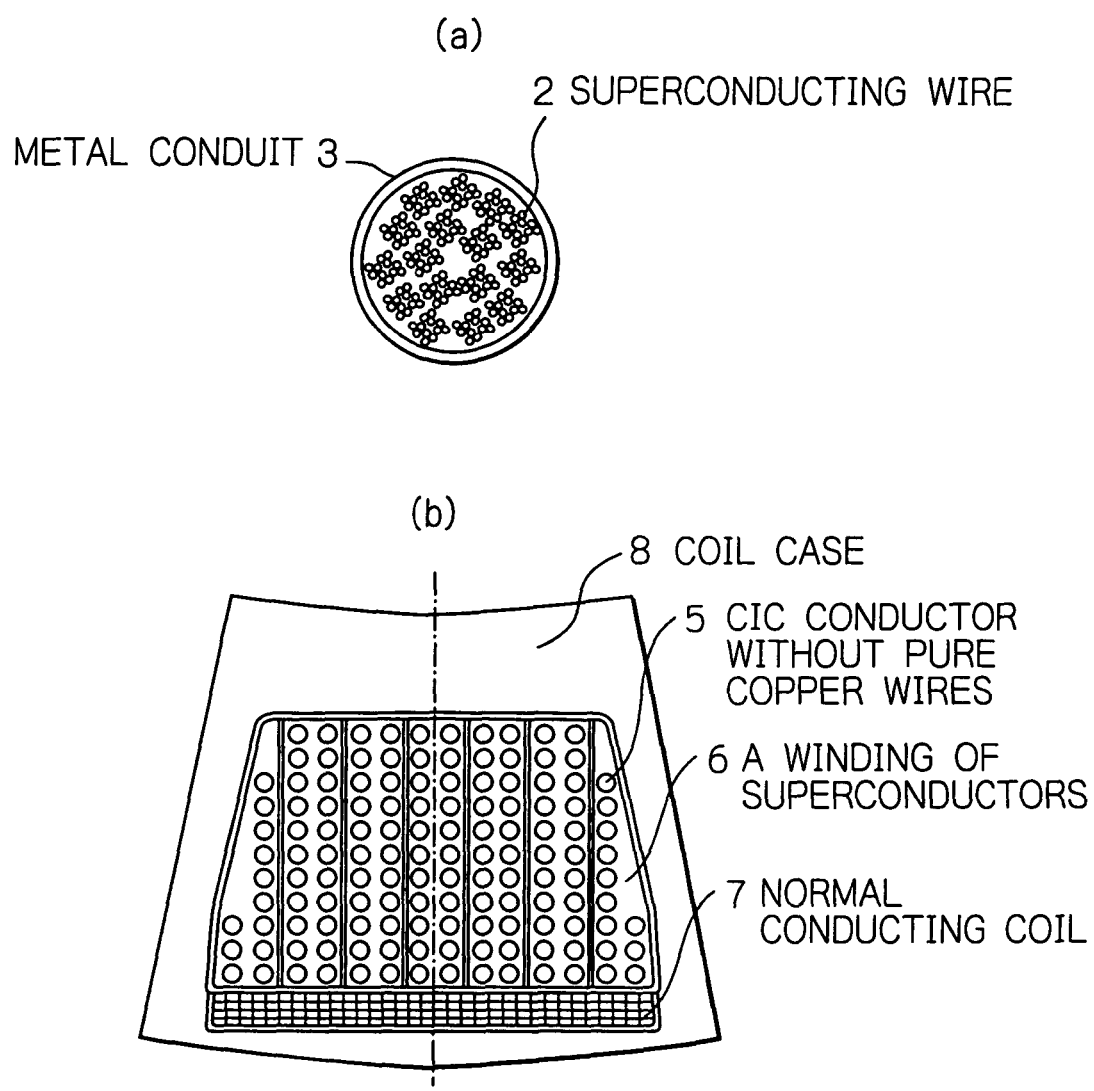
FIG. 3A is a cross section of a CIC superconductor according to the present invention which does not contain pure copper wires.
FIG. 3B is a cross section of a superconducting coil having both a winding of such CIC superconductors and a normal conducting coil housed in a coil case.

An example of the superconducting coil system of the invention which contains a normal conducting coil is depicted in FIG. 3A which is a cross section of a CIC conductor which is solely made of about 200 superconducting wires 1 housed in a metal conduit 3 without pure copper wires and in FIG. 3B which is a cross section of a superconducting coil which has a winding 6 of such conductors 5 and a normal conducting coil 7 housed in a coil case 8.

The superconducting coil system of the invention comprises a superconducting coil solely fabricated of cable-in-conduit conductors without pure copper wires and a normal conducting coil which allows a portion of current flow to bypass the superconducting coil by induction.

In the superconducting coil system of the invention, the normal conducting coil has a current time constant ($L_2/R_2$) which is larger than $L_1/R_1$, or the time constant at which the current through the superconducting coil decays rapidly after the conductors in the superconducting coil made a transition to the normal conducting state. Symbols $L_1$ and $L_2$ represent the self-inductances of the superconducting coil and the normal conducting coil, respectively. Symbol $R_1$ represents the resistance during rapid demagnetization, or the resistance for causing rapid decay of the current flow through the superconducting coil, and $R_2$ represents the resistance of the normal conducting coil. The normal conducting coil having these characteristics can be fabricated from copper, aluminum and other metal conductors of low resistance.

The superconducting coil system of the invention must satisfy the above-described time constant conditions but it is not limited by other conditions including the sizes of the superconducting coil and the normal conducting coil, and their relative positions in the system. Hence, the superconducting coil system of the invention embraces a variety of embodiments including the one depicted in FIG. 3.

When the current flowing through a superconducting wire is reduced abruptly, an induction current flows through the electrically coupled normal conducting coil and the amount of current flow through the superconducting wire decreases correspondingly. The relationship between the current flowing through the group of superconducting wires in the superconductors in the superconducting coil and the current flowing through the conductors in the normal conducting coil can be expressed by the following equations:

$$I_1 = A_1 \exp(-(a-b)t) + B_1 \exp(-(a+b)t)$$

$$I_2 = A_2 \exp(-(a-b)t) + B_2 \exp(-(a+b)t)$$

where $I_1$ and $I_2$ represent the current flows through the superconducting and normal conducting coils, respectively; t represents time; and $A_1$, $A_2$, $B_1$, $B_2$, a and b represent constants determined by the initial current through the superconducting coil, the self-inductances ($L_1$ and $L_2$) of the superconducting and normal conducting coils, their resistances and mutual inductance (M).

Calculations and the resulting data are shown in FIGS. 4A and 4B. FIG. 4A shows how the current through a superconducting coil which was fabricated of conductors containing pure copper wires diminished when it was caused to decay rapidly to zero; and FIG. 4B shows how the current through a superconducting coil which was fabricated of conductors containing no pure copper wires and the current through a normal conducting coil coupled electrically to the superconducting coil diminished when the current through the superconducting coil was caused to decay rapidly to zero.

The current flowing through the normal conducting coil was initially zero and increased with time, peaked at a certain point of time and decreased thereafter. The sum of the current through the superconducting coil and the current through the normal conducting coil is substantially equal to the change in the current flowing through a superconducting coil comprising the conventional superconductors containing pure copper wires. Hence, the amount of a varying magnetic field applied to the vacuum chamber is substantially the same as what is applied in the prior art and the vacuum chamber will not be damaged.

In order for the normal conducting coil to be effective, it must have large enough electrical coupling to the superconducting coil. In other words, the efficiency of coupling between the normal and superconducting coils ($k = M/(L_1 * L_2)^{0.5}$) is desirably at least 0.5 (50%).

Figure 1:
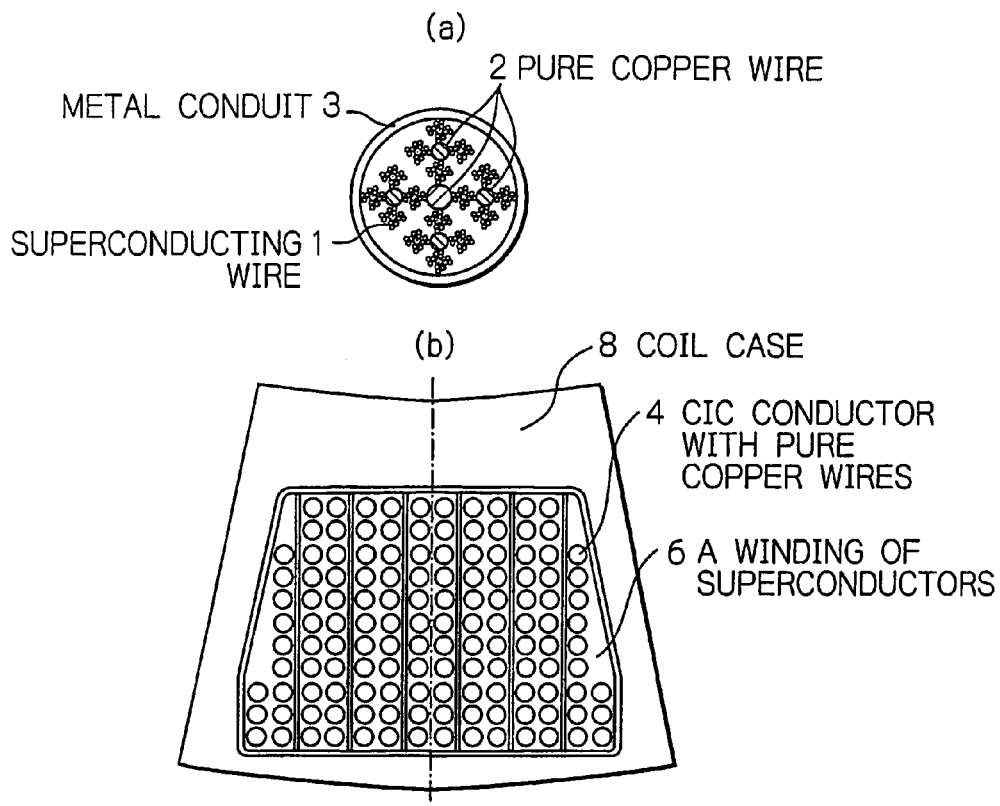
FIG. 1A is a cross section of a conventional CIC superconductor containing pure copper wires.
FIG. 1B is a cross section of a superconducting coil having a winding of such CIC superconductors housed in a coil case.

FIG. 3A is a cross section of a superconducting coil coupled to a normal conducting coil in an embodiment of the present invention. The conductor in the superconducting coil is a CIC conductor that consists solely of superconducting wires as depicted in FIG. 3A and does not contain pure copper wires. In terms of cross-sectional area, this conductor is two thirds of the CIC conductor shown in FIG. 1A which contains pure copper wires. This realizes a corresponding decrease in the cross-sectional area of a winding of the conductors buried in grooves cut spirally into plates. On account of the resulting decrease in area, an extra space becomes available for accommodating the normal conducting coil. The conductors of the normal conducting coil are rectangular monolithic copper wires which are covered with an insulation coating, wound into a solenoid and impregnated with an epoxy to form a coil. Both ends of the coil are joined directly to form a loop. The thus fabricated normal conducting coil is housed in a coil case together with the superconducting coil.

The present invention offers the following advantages.

1. By eliminating the pure copper wires, the size of superconductors is reduced and the cost of their fabrication is reduced since they have higher current density. The decrease in size is typically about two thirds of the conventional CIC conductor using pure copper wires.

2. The decreased size of the conductor contributes to reducing the cross-sectional area of the winding which in turn contributes to the fabrication of a compact coil and, hence, the reduction of the cost of coil fabrication.

3. The normal conducting coil can consume about one half of the magnetic energy accumulated in the coil system, so the external resistance provided outside of the superconducting coil can be reduced by half, thus contributing to reducing by half the initial cost of the resistor and its installation volume.

4. Unlike the superconducting coil, the normal conducting coil is not subjected to heat treatments, so it permits a wide range of materials to choose from and can be fabricated of copper, aluminum, lead or composites thereof depending upon the characteristics required of the superconducting coil.

5. The superconducting coil system of the invention which finds particularly efficient use in nuclear fusion reactors is also useful in other equipment such as a magnetic energy accumulator.

What is claimed is:

1. A superconducting coil system comprising a superconducting coil solely made of superconducting wires housed in a metal conduit without pure copper wires and a normal conducting coil which is electrically coupled to the superconducting coil and allows a portion of current flow to bypass the superconducting coil by induction, the superconducting coil and the normal conducting coil being arranged separately in a coil case, and the normal conducting coil having a current time constant ($L_2/R_2$) which is larger than $L_1/R_1$, or the time constant at which the current through the superconducting coil decays rapidly after the conductors in the superconducting coil made a transition to the normal conducting state, in which $L_1$ and $L_2$ represent the self-inductances of the superconducting coil and the normal conducting coil, respectively, $R_1$ represents the resistance for causing rapid decay of the current flow through the superconducting coil, and $R_2$ represents the resistance of the normal conducting coil.

2. The superconducting coil system according to claim 1 wherein the coefficient of electrical coupling between the superconducting coil and the normal conducting coil is at least 50%.

3. The superconducting coil system according to claim 1, wherein the superconducting coil is fabricated of cable-in-conduit conductors.

4. The superconducting coil system according to claim 2, wherein the superconducting coil is fabricated of cable-in-conduit conductors.

5. The superconducting coil system according to claim 1, wherein the normal conducting coil is fabricated of copper, aluminum or other metal conductors of low resistance.

6. The superconducting coil system according to claim 2, wherein the normal conducting coil is fabricated of copper, aluminum or other metal conductors of low resistance.

7. The superconducting coil system according to claim 3, wherein the normal conducting coil is fabricated of copper, aluminum or other metal conductors of low resistance.

8. The superconducting coil system according to claim 4, wherein the normal conducting coil is fabricated of copper, aluminum or other metal conductors of low resistance.

* * * * *